Aug. 11, 1953 — T. W. ZOBEL — 2,648,250
INTERFEROMETER APPARATUS WITH MEASURING GRID
Filed Oct. 30, 1950
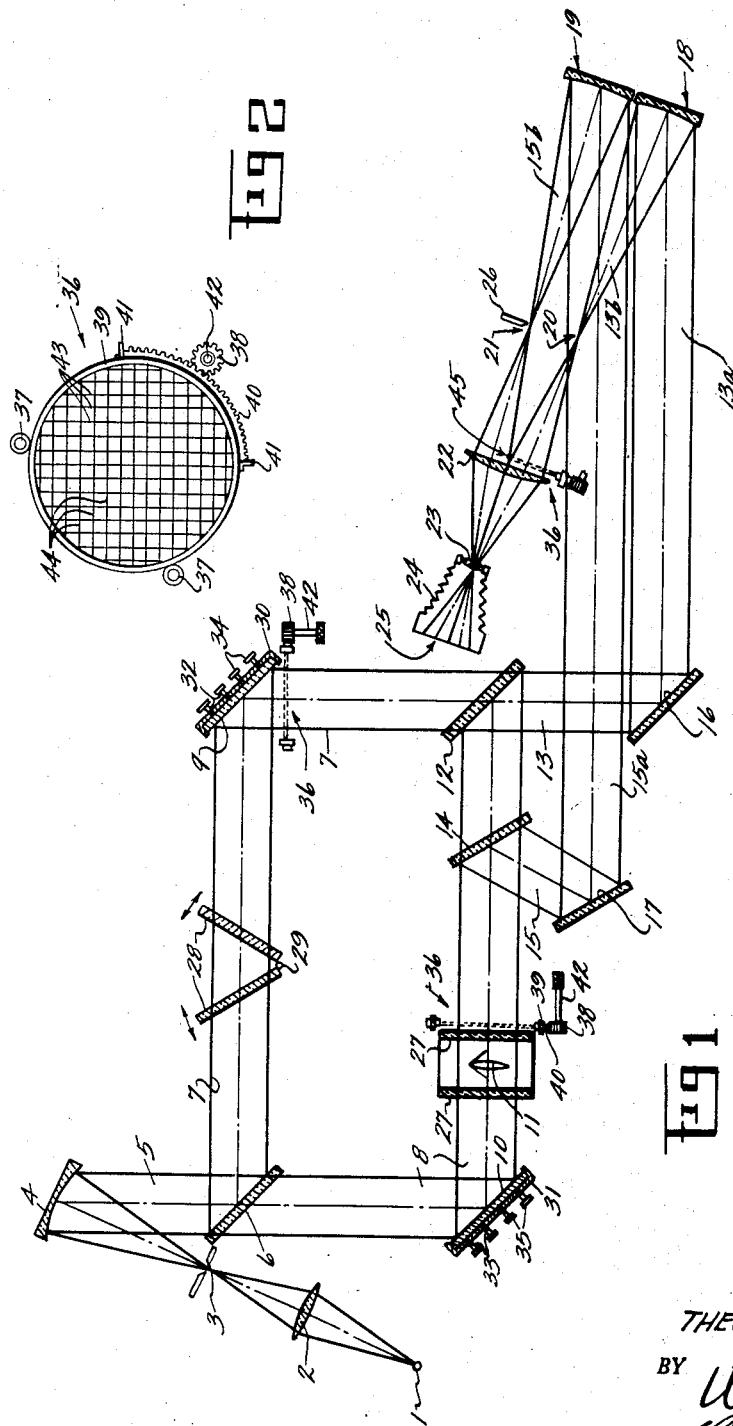
INVENTOR.
THEODOR W. ZOBEL Patented Aug. 11, 1953

2,648,250

UNITED STATES PATENT OFFICE 2,648,250

INTERFEROMETER APPARATUS WITH MEASURING GRID

Theodor W. Zobel, Braunschweig, Germany

Application October 30, 1950, Serial No. 193,009

4 Claims. (Cl. 88—14)

(Granted under Title 35, U. S. Code (1952), sec. 266)

The invention described herein may be manufactured and used by or for the Government for governmental purposes without payment to me of any royalty thereon.

This invention relates to interferometer apparatus and more particularly to four-plate interferometers, and combined Interference-Schlieren apparatus, including the provision of adjustable grid members disposed in either the collimated partial light beam traversing the test medium or in the collimated light beam not traversing the test medium, or in both of the partial light beams, the grids being preferably located between the points where the initial collimated light beam is divided or split to form the two partial light beams and the point where the two partial beams are recombined to form the interference beams.

In interference apparatus of the four-plate type there are two kinds of adjustments which can be made for controlling or producing the interference phenomena. One is the adjustment for infinite width of fringes, this being characterized by the fact that only parallel light beams are interfering, no distinct stripes or fringes being visible in the interference picture, only a uniformly "shaded" field appears, if and when the reflector plates and mirrors within the four-plate system are constructed of very high optical quality glass and the reflecting or partial reflecting surface conditions are optically flat or substantially flat. If density changes are produced by the medium to be investigated then fringes of constant density appear in the interference picture which, in special cases, can be identical with fringes of constant pressure and velocity. This method is often used in wind tunnel work and similar investigations for the reasons that this evaluation process of such pictures is very convenient and agreeable.

There are many cases in interferometer measuring technique where this adjustment cannot be used, requiring that the other adjustment, that of producing finite interference fringes or stripes be used instead. The relative displacement of every point on an interference fringe is a measure of the density change. For this reason in every measuring point this displacement must be measured from an undisturbed point before the test is started. The field of undisturbed interference fringes before a test is started is therefore the comparison base for the evaluation process.

Depending upon the kind of investigation and upon the desired sensitivity of the optical measuring process the width of the fringes is chosen and this can be done by the adjustment of the interference apparatus. The width of the fringes can be chosen and calculated by the formula $$b = \frac{\lambda}{\sin \alpha_i}$$

wherein $\lambda$ is the wave length of the light being used, and $\alpha$ is the angle between the interfering light rays leaving the apparatus. If the interferometer apparatus is of high quality, the reflecting surfaces being very correct or optically flat, the interference fringes will be straight and parallel, and their distance will be equal over the entire viewing field.

Evaluations can be made, however, from interference pictures, if there are no straight fringes and the distance between the fringes is not equal. Evaluations under the latter conditions can be made however only with a compromise, and with a small but uncertain degree of accuracy. It is possible to use a grid system with lines of constant width copied into the finally enlarged interference picture. Since absolutely flat reflector plates and mirrors cannot be produced, absolutely straight and parallel interference fringes cannot be obtained and therefore no absolutely constant width of fringes is possible and the fringe width varies over the field. For this reason the frame on which the enlargement is made and carrying the measuring grid for constant width of fringes is adjustable and can be turned about axes perpendicular to each other. With a small degree of rotation of the frame on which the enlargement is made and carrying the grid the width of fringes of the interference picture can be corrected in this way, and in the final enlargement there is a constant width of fringes. This method is very successful and useful, and effects a higher accuracy of the evaluation, and a remarkable saving of time for the whole evaluation process.

In accordance with my copending application for Interference Device for Evaluating Phenomena Over a Large Region, Serial No. 749,071 filed May 19, 1947, Patent No. 2,555,387, dated June 5, 1951, it is possible and practical to deform optical reflecting surfaces to a state of optical perfection never reached in large plates by repeated grinding, polishing and testing, and for this reason it is not necessary to copy a grid system in every final interference picture, which operation required some care and is inconvenient to perform.

In the subject invention grid members with measuring lines or coordinates thereon can be installed directly within the interference apparatus in or near the plane of the medium to be investigated, or for instance they may be located in the image plane on which the camera is focused. Before the pictures are taken the width of the fringes and their direction are adjusted relative to the grid coordinates by the interference apparatus itself or the grid is adjusted in position to register with the fringes. Since different widths of fringes are desired also extending different directions, either single fixed grids with constant width divisions or coordinates are provided each rotatably adjustable relative to each other about a central axis relative to the one of the split or partial light beams, or the Schlieren beam, or a grid frame is provided in which the plural grid lines or coordinate indicia are adjustable to conform to different width fringes. This grid is preferably also rotatably adjustable to dispose the grid lines in the general linear direction of the fringes.

If the measuring grid is installed in the measuring light beam which traverses the test medium containing the model being investigated no grid lines will appear within the half shadow of the model, while if the grid is installed in the other partial light beam which does not traverse the test medium the grid lines will appear also within the model shadow. Since the light passes in two different ways or separate paths in a four-plate interferometer system, the grid will be pictured as a half shadow exteriorly of the model and a full shadow within the model half shadow and the grid lines can be easily distinguished from their surroundings. Although it is also contemplated to place the grids in both of the partial light beams, the adjustment to obtain satisfactory registration of the two sets of grid lines in the interference beam is somewhat difficult and inconvenient, and the fact that the grid lines would appear darker on the viewing screen exteriorly of the model shadow does not ordinarily justify the difficult adjustment required.

An advantage of the subject invention is that after making the adjustments of the interferometer apparatus to coordinate the width and direction of the fringes with the grid lines or coordinates to be photographed there will be no disturbed density field in successive pictures. Every interference picture of the disturbed field contains a similar image of the measuring grid in the most accurate reference position in the field. Even in high speed photography of 1,000 pictures per second every picture will have the original grid image therein in exactly the same position, providing excellent accuracy for the quantitative evaluation of the interference phenomena.

Where a four-plate interfrometer system is employed in which the testing partial light beam traversing the test medium is again split to produce a Schlieren beam a grid disposed in this test beam before the beam is split will produce a grid image in both the interference beam and in the Schlieren beam.

Other objects and advantages will become apparent from the following description, taken in connection with the accompanying drawings in which like reference characters refer to like parts in the several figures.

Figure 1 is a somewhat diagrammatic longitudinal section view through a four-plate interferometer apparatus incorporating my invention, the improved grid arrangement being indicated by heavy dotted lines, and Figure 2 is a plan view showing somewhat diagrammatically one of the grid members and the means for rotatably supporting and adjusting the same.

Referring more particularly to Figure 1 the reference numeral 1 denotes a monochromatic light source having a lens 2 for concentrating the light from the source 1 through a light aperture 3 onto the surface of a large concave mirror or lens means 4, the point 3 being substantially at the focal distance of the concave mirror 4 but slightly offset laterally from the axis of the mirror to provide a somewhat Z-shaped light inlet source. The concave reflector 4 collimates the light rays to produce the collimated reflected light beam 5 which is projected onto the partially transparent reflecting surface of a beam splitting plate 6 inclined across the reflected beam 5, preferably at about an angle of 45°. The collimated light beam 5 is then split to form two partial beams of collimated light 7 and 8, one partial beam 7 being reflected by the partially transparent reflecting surface of a beam splitting plate 6 and the other collimated partial beam 8 passing through the plate 6. Full reflecting plates or mirrors 9 and 10 are provided and are inclined across the partial beams 7 and 8 to reflect the two beams across each other after the beam 8 has traversed the test medium 11 and a model therein. A second beam splitting plate 12 is inclined across the partial light beams 7 and 8 at their point of intersection for recombining them to form the interference light beam 13 in the manner of the conventional well known four-plate interferometer system.

If a Schlieren image is desired adjacent the interference image a third beam splitting or partially transparent reflector plate 14 is inclined across the partial light beam 8 after it has traversed the test medium 11 and model for obtaining a Schlieren beam 15. The recombined or interference beam 13 and the Schlieren beam 15 are reflected in parallel relation to each other by full mirrors 16 and 17, the beams being indicated at 13a and 15a are reflected onto the surfaces of two side-by-side precision concave mirrors 18 and 19 preferably disposed slightly "off axis," which reflect the beams out of the axes of the beams 13a and 15a and converge the respective interference and Schlieren beams, as indicated at 13b and 15b, through focal points 20 and 21 to a lens system or a pair of separate side-by-side lens elements 22. The beams 13b and 15b then pass through the lens system 22 and optical or lens system 23 of a camera, or an interference image viewing or recording deice 24, having a viewing screen or sensitized image receiving surface 25 in the focal plane thereof. A Schlieren knife edge member 26 is disposed to engage the side of the Schlieren beam 15b, substantially at the focal point 21 of the concave mirror 19 to produce the darkened or shaded light field and Schlieren image or shadow picture on the focal plane 25 of the viewing device or camera 24.

The test chamber 11 usually includes a glass windowed chamber, such as a wind tunnel having opposite side windows 27 of high optical quality glass plates for the test beam 8 to pass through, and in order to compensate for the passage of the light beam 8 through these windows 27 a pair of optically flat glass compensating plates 28 are adjustably inclined across the partial light beam 7 which does not traverse the test medium 11. The pivotal adjustment of these transparent plates 28 around the pivot point 29 compensates for the thickness of the windows 27 and the change in wave length between the two partial beams 7 and 8, particularly due to the passage of the test beam 8 through the plates 27 of the chamber containing the test medium therebetween.

The two full mirrors or reflector plates 9 and 10 must be as near optical perfection as possible, and in order to obtain corrections not possible by grinding and polishing in very large plates these mirrors 9 and 10 are mounted in rigid supporting frames 30 and 31 having a plurality of fine adjustment jacks or screws 32 and 33 passing through threaded openings in the back walls of the frames. The screws 32 and 33 are provided with adjusting means and for simplicity are indicated as adjusting heads 34 and 35, the inner ends of the screws 32 and 33 being preferably connected for universal movement to the rear faces of the full reflectors 9 and 10. With the interferometer in operation a fine adjustment of these screws 32 and 33 makes it possible to correct slight or infinitesimal inaccuracies in the contour of the otherwise flat mirrors 9 and 10.

The mirror 9, or the mirror 10, may be adjustable both parallel to the axis of the beam reflected by it, or reflected to it, and in addition a tiltable adjustment is preferably provided, so as to adjust and equalize the lengths of the partial beams 7 and 8 and bring the light waves thereof into proper wave length phase relation. This is a conventional adjustment and is not shown.

According to the subject invention a measuring grid member 36 may be provided, interposed in one of the partial light beams 7 or 8, or two measuring grids 36 may be provided, one interposed in each of the beams 7 and 8, one of these grid members being illustrated somewhat diagrammatically in detail in Figure 2.

These grid members are each adjustable about an axis parallel to the partial light beam axis in which they are placed, preferably concentric to the center of the beam. The grid members each include adjustable supports such as rollers or bearing members 37 and 38 for supporting the grid frame 39 in the partial light beam. The supporting rollers 38 may each be provided with a friction surface or a gear tooth periphery 39 which engages a similar or complementary friction or rack portion 40 extending partly around the periphery of the grid frame. Stops 41 are provided to permit a rotary adjustment of the grid frame only slightly in excess of 90°. An adjusting shaft 42 is provided having a conventional fine adjustment or slow motion drive means (not shown) which is operated manually by a knob, providing the means for angularly adjusting the grid members in the beams. The rollers 38 and 37 may also be carried on a frame which is adjustable laterally to the axis of the partial light beam.

The grid indicia or bars may be formed from fine webs or threads 43 which extend across the frame in parallel relation to each other, or may compose two parallel groups of web or coordinates extending transversely to each other as indicated at 43 and 44. The grid member may also comprise a thin transparent support or flat glass plate on which the grid lines 43 and 44 are photographed, etched or engraved. Such grid plate must be compensated within the other beam by a similar glass plate.

When the grid member 36 is used in the beam 8 without the other grid member 36 in the beam 7, the grid image or shadow is visible in the interference and Schlieren images on the recording screen 25 as a half shadow, extending only to the periphery of the model or article interposed in the test medium 11 between the windows 27, and that portion of the grid which extends across the partial beam in the shadow of the model is, of course, not visible. When the grid member 36 only is used in the partial beam 7, the coordinate lines or bars of the grid are visible on the screen as a half shadow extending across the entire area of the interference beam and provides a satisfactory calibrating or measuring element for comparing displacements of the fringes formed by the beams 7 and 8.

In the operation of an interferometer apparatus provided with the grid member 36 in beam 8, or grid members 36 in both beams 7 and 8, the interferometer apparatus will be initially adjusted to produce the desired minimum number of interference fringes and determine the direction of the fringes. The grid members may then be adjusted or rotated to position the direction of the grid coordinates or marking 43 or 44 as near parallel or coincident to the interference fringes as possible, or the grid members may be moved in the light beam in any desired direction perpendicular to the axis of the intereference beam to predetermine the position of the grid coordinate line shadows relative to the interference fringes in order to measure the relative degree of movement and the change in direction of the fringes when the test is actually made. All tests subsequent thereto will therefore show the displacement of the fringes in the interference beam relative to the undisturbed grid, regardless of the number of pictures made by the camera 24 or the rate at which the pictures are made. All changes in the interference fringes will be visible at the recording or viewing screen 25 superimposed on the images or shadows of the grids.

When two adjustable grid frames 36 are employed, one in each of the beams 7 and 8, it is possible to obtain a full shadow of the grid coordinates in the final interference and Schlieren pictures in the area extending around the exterior of the recorded or viewed shadow of the model in the test medium, that portion of the grid extending across the model being visible as a half shadow. This arrangement utilizing two grid members is desirable but requires precision adjustment of the grids. It is somewhat difficult to place the shadow images of the grid bars or lines of both of the grids in coincident registration on the viewing screen or focal plane 25.

If desired each of the grids may have their coordinates indicia or lines disposed in parallel relation in one direction only and each grid may be adjusted independently to dispose the grid coordinates of one of the members at any desired angle relative to the coordinate lines of the other grid member and adjust relative to the direction and position of the interference fringes.

The grid member 36 in beam 8 is preferably disposed close to the plane occupied by the test medium or a test model therein so as to be substantially in the same image plane so as to produce a clear image or shadow of the grid lines in the camera plane at 25. A shiftable coordinate grid member may also be placed in the plane indicated at 45, substantially in the image forming plane of the concave lens or reflector means 18 immediately next to the lens 22. In all instances however, once the grid member is, or grid members are adjusted relative to the interference fringes, the position of the grid member or members need not be disturbed thereafter in subsequent interference pictures involving the same test model or medium.

Having shown and described my invention in connection with a simple embodiment of interferometer, I do not wish to be limited to the exact form shown or described, since obvious minor changes, may be made in size, shape and arrangement of parts without departing from the spirit of the invention, the scope of the invention being limited only by the appended claims.

What I claim is:

1. An interferometer apparatus comprising a concentrated light source, means for collimating light from the light source to form a collimated light beam, first beam splitting means positioned in the collimated light beam for dividing the collimated light beam into two diverging partial beams of collimated light, reflector plates disposed in said partial beams for reflecting said partial light beams toward and across each other at a predetermined distance from said beam splitting means, one of said partial light beams comprising a test beam disposed to traverse a test medium when said test medium is interposed in said test beam, and the other partial beam comprising a comparison beam, a second beam splitting means disposed across both of the said partial beams at the point of intersection thereof to recombine said beams to form an interference beam after the test beam has traversed the position where the test medium is to be interposed in said test beam, image forming means in said interference beam having its image plane located in a transverse plane through the test partial beam where the test medium in introduced, and a grid member interposed perpendicularly in the comparison beam, between the first and second beam splitting means at an optical distance from the image forming means substantially equal to the distance between the image forming means and said image plane.

2. An interferometer comprising a light source, means for collimating light from said source to form a light beam, beam splitting means in the collimated light beam for dividing the same into two diverging partial beams of collimated light, reflector plates disposed in said partial beams for reflecting said partial light beams toward and across each other at a predetermined distance from said beam splitting means, one of said partial beams traversing a test medium interposed therein, a second beam splitting means disposed in said partial beams at the point of intersection thereof to recombine the partial beams to form an interference beam, an adjustable grid member interposed in each of said partial light beams, image forming lens means having its axis in said interference beam and having an image plane passing through the test medium and passing substantially through the grid means in both partial light beams, an image recording screen in the focal plane of the image forming lens means for simultaneously receiving an image of the test medium and said adjustable grid member in associated superimposed relation with the light wave interference shadows formed by the interference beam.

3. An interferometer apparatus, comprising a light source, light collimating means adjacent the light source for producing a collimated light beam from the light source, beam splitting means interposed across the collimated light beam for splitting the collimated light beam to form two spaced partial beams of collimated light, one of said collimated partial light beams comprising a test beam and adapted to receive the test medium therein, and the other collimated partial light beam comprising a measuring beam, beam recombining means disposed across the path of both the test and measuring beams at equal optical distances from the beam splitting means for recombining said partial light beams to form an interference light beam, and a grid member interposed across at least one of the said collimated partial light beams between the beam splitting means and said beam recombining means, for producing an image of the grid member in the interference beam imposed on an image of a test medium when a test medium is interposed in the test beam, means for rotatably adjusting the grid member in a plane perpendicular to the axis of the partial light beam containing the grid member, to rotate the image of the grid member in the interference beam relative to the image of a test medium when interposed in the test beam to adjust the axis of the image of the grid member in the interference beam, relative to the interference fringes in the interference beam and the position of an image of a test medium in the interference beam when a test medium is interposed in the test beam between said beam splitting and recombining means.

4. An interferometer apparatus, comprising a light source, light collimating means adjacent the light source for producing a collimated light beam from the light source, beam splitting means interposed across the collimated light beam for splitting the collimated light beam to form two spaced partial beams of collimated light, one of said collimated partial light beams comprising a test beam and adapted to receive the test medium therein, and the other collimated partial light beam comprising a measuring beam, beam recombining means disposed across the path of both the test and measuring beams at equal optical distances from the beam splitting means for recombining said partial light beams to form an interference light beam, and a grid member interposed across at least one of the said collimated partial light beams between the beam splitting means and said beam recombining means, for producing an image of the grid member in the interference beam imposed on an image of a test medium when a test medium is interposed in the test beam, said light source comprising a concentrated monochromatic light having a light slit aperture, and concave mirror means having a focal point at said aperture for producing said beam of collimated light, a second beam splitting means in the test partial light beam for splitting the test beam, after its traverse of a test medium when interposed in said test beam, to produce a Schlieren beam, a Schlieren image receiving screen in the Schlieren beam, an interference image receiving screen in the interference beam located in the same plane as the Schlieren image receiving screen, said screens being at substantially equal optical distances from the first mentioned beam splitting means, lens means positioned in the Schlieren beam for converging the Schlieren beam through the focal point of the said lens onto the Schlieren image receiving screen, a Schlieren knife edge disposed to engage the Schlieren beam at the last mentioned focal point, said grid member being adjustably mounted in the test beam between the first mentioned beam splitting means and said second beam splitting means, whereby an image of the said grid member is simultaneously imposed on the interference and Schlieren image receiving screens in superimposed relation to the interference and Schlieren shadows in the interference and Schlieren beams, when a test medium is interposed in the test beam.

THEODOR W. ZOBEL.

References Cited in the file of this patent

UNITED STATES PATENTS

| Number | Name | Date |
|---|---|---|
| 1,590,532 | Lenouvel | June 29, 1926 |
| 2,256,855 | Zobel | Sept. 23, 1941 |
| 2,338,981 | Straub | Jan. 11, 1944 |
| 2,452,364 | Fowler et al. | Oct. 26, 1948 |
| 2,541,437 | Prescott | Feb. 13, 1951 |

FOREIGN PATENTS

| Number | Country | Date |
|---|---|---|
| 730,333 | Germany | May 1, 1942 |